US010300683B2

(12) United States Patent
Nielsen et al.

(10) Patent No.: US 10,300,683 B2
(45) Date of Patent: May 28, 2019

(54) COATED WOOD VENEER

(71) Applicant: 3M INNOVATIVE PROPERTIES COMPANY, St. Paul, MN (US)

(72) Inventors: Kent E. Nielsen, Dorchester (CA);
Arianne E. McCarthy, London (CA);
Frank A. Brandys, London (CA);
Gilles Simard, Repentigny (CA);
Nadia Boudif, Stamford, CT (US);
Raul P. Moraes, London (CA);
Shelbey M. Weese, Foreset (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/746,135

(22) PCT Filed: Jul. 25, 2016

(86) PCT No.: PCT/US2016/043853
§ 371 (c)(1),
(2) Date: Jan. 19, 2018

(87) PCT Pub. No.: WO2017/019596
PCT Pub. Date: Feb. 2, 2017

(65) Prior Publication Data
US 2018/0222159 A1 Aug. 9, 2018

Related U.S. Application Data

(60) Provisional application No. 62/197,251, filed on Jul. 27, 2015.

(51) Int. Cl.
*B32B 21/14* (2006.01)
*B05D 7/06* (2006.01)
*B05D 7/00* (2006.01)
*B32B 27/40* (2006.01)
*B32B 33/00* (2006.01)

(52) U.S. Cl.
CPC .............. *B32B 21/14* (2013.01); *B05D 7/06* (2013.01); *B05D 7/58* (2013.01); *B32B 27/40* (2013.01); *B32B 33/00* (2013.01); *B05D 7/57* (2013.01); *B32B 2255/08* (2013.01); *B32B 2255/28* (2013.01); *B32B 2305/026* (2013.01); *B32B 2307/3065* (2013.01); *B32B 2307/4026* (2013.01); *B32B 2307/412* (2013.01); *B32B 2307/536* (2013.01); *B32B 2375/00* (2013.01); *B32B 2451/00* (2013.01)

(58) Field of Classification Search
CPC ........ B32B 21/14; B32B 27/40; B32B 33/00; B32B 2255/08; B32B 2255/28; B32B 2305/026; B32B 2307/3065; B32B 2307/4026; B32B 2307/412; B32B 2307/536; B32B 2375/00; B32B 2451/00; B05D 7/06; B05D 7/58; B05D 7/57
USPC ...................................................... 428/537.1
See application file for complete search history.

(56) References Cited

U.S. PATENT DOCUMENTS

| 6,475,623 | B1 * | 11/2002 | Magnusson | B05D 7/06 428/142 |
| 6,555,177 | B1 * | 4/2003 | Magnusson | B05D 7/08 427/384 |
| 8,236,384 | B2 | 8/2012 | Azuelos | |
| 8,710,166 | B2 | 4/2014 | Tong | |
| 2004/0121160 | A1 | 6/2004 | Neppl | |
| 2004/0185256 | A1 * | 9/2004 | Zastrow | B05D 7/06 428/411.1 |
| 2008/0226916 | A1 | 9/2008 | Steeman | |
| 2013/0084426 | A1 | 4/2013 | Qi | |

FOREIGN PATENT DOCUMENTS

| DE | 102004026739 | * 12/2005 |
| WO | 2005/018833 | * 3/2005 |
| WO | WO 2005-018833 | 3/2005 |
| WO | WO2014/202144 | * 12/2014 |
| WO | WO 2014-202144 | 12/2014 |

OTHER PUBLICATIONS

Challener, "Smart Coatings Continue to Develop", JCT Coatings Tech, 2008, vol. 5, No. 2, pp. 38-42.
Gloge, "Optical-Fiber Packaging and its Influence on Fiber Straightness and Loss", The Bell System Technical Journal, Feb. 1975, vol. 54, No. 2, pp. 245-262.
Gonzalez-Garcia, "A Combined Mechanical, Microscopic and Local Electrochemical Evaluation of Self-Healing Properties of Shape-Memory Polyurethane Coatings", Electrochimica Acta, 2011, vol. 56, No. 26, pp. 9619-9626.
Hayashi, "US-Japan Workshop on Smart Materials and Structures", Proceedings from the first US-Japan Workshop, Dec. 1995, 17pgs.
Li, "A Self-Healing Particulate Composite Reinforced with Strain Hardened Short Shape Memory Polymer Fibers", Polymer, 2013, vol. 54, No. 18, pp. 5075-5086.
Luo, "Shape Memory Assisted Self-Healing Coating", ACS Macro Letters, 2013, vol. 2, No. 2, pp. 152-156.

(Continued)

*Primary Examiner* — Leszek B Kiliman
(74) *Attorney, Agent, or Firm* — Philip P. Soo

(57) ABSTRACT

Compositions comprising wood veneer coated by a substrate contacting layer, a middle layer, and a top layer, methods of making such compositions and articles comprising such compositions.

15 Claims, 1 Drawing Sheet

(56) References Cited

OTHER PUBLICATIONS

Seraji, "Effects of Hydrostatic Pressure and Thermal Loading on Optical Fibers Coated with Multilayer Segmented Young's Modulus Materials", International Journal of Optics and Applications, 2012, vol. 2, No. 2, pp. 6-14.
Urban, "Stimuli-Responsive Polymeric Films and Coatings", ACS Symposium Series, 2005, vol. 912, pp. 1-25.
Yang, "Modification of Waterborne Polyurethane Coating and its Properties of Shape Memory", Chiene: Cailio Kexue Yu Gonsheng Xuebao (Journal of Materials Science & Engineering), Feb. 2009, vol. 27, No. 1, pp. 99-103.
International Search Report for PCT International Application No. PCT/US2016/043853, dated Oct. 10, 2016, 5pgs.

\* cited by examiner

US 10,300,683 B2

COATED WOOD VENEER

CROSS REFERENCE TO RELATED APPLICATIONS

This application is a national stage filing under 35 U.S.C. 371 of PCT/US2016/043853, filed Jul. 25, 2016, which claims the benefit of U.S. Provisional Patent Application No. 62/197,251, filed Jul. 27, 2015, the disclosures of which are incorporated by reference in their entirety herein.

TECHNICAL FIELD

This disclosure relates to articles having coated wood or coated wood veneer

BACKGROUND

Wood and wood veneer can be used for a variety of decorative and functional purposes. Some wood and wood veneer has an attractive grain pattern, which adds value to both decorative and functional articles made from the wood or wood veneer.

Employing protective coatings on wood or wood veneer is challenging. Such coatings can crack or damage the wood or wood veneer, thereby marring its aesthetic value, as the wood or wood veneer can shrink or expand with changes in environmental conditions such as heat and humidity. Prior attempts to stabilize the wood or wood veneer do not necessarily provide acceptable outcomes.

SUMMARY

An article can comprise a wood or wood veneer substrate, a substrate contacting layer on the wood or wood veneer substrate, wherein the substrate contacting layer is soft and has a thickness of 25 micrometers to 125 micrometers as measured from surface of the wood veneer to the outermost surface of the substrate contacting layer, a middle layer on the substrate contacting layer, the middle layer comprising polyurethane, wherein the middle layer is soft and has a thickness of 100 micrometers to 250 micrometers, and a top layer on the middle layer, wherein the top layer is hard, and has a thickness of 100 to 250 micrometers.

DETAILED DESCRIPTION

Figure 1:
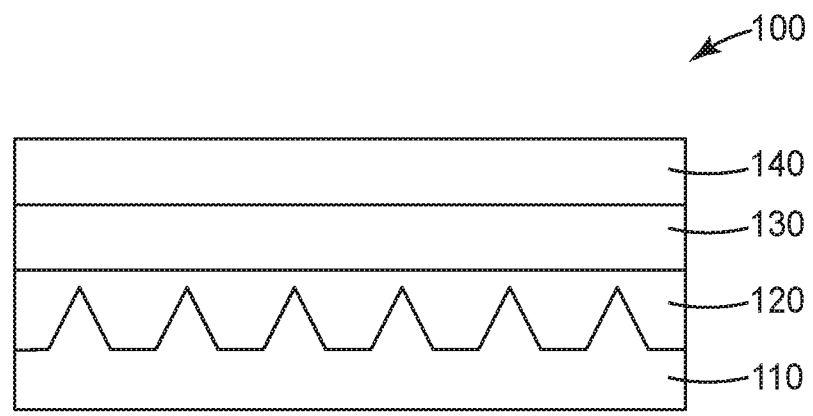
FIG. 1 is a schematic of a piece of wood with a substrate contacting layer on the wood, a middle layer on the substrate contacting layer, and a top layer on the middle layer.

Throughout this disclosure, singular forms such as "a," "an," and "the" are often used for convenience; however, it should be understood that the singular forms are meant to include the plural unless the singular alone is explicitly specified or is clearly indicated by the context. It should also be understood that the disjunctive form "or" is used herein to include the conjunctive unless the disjunctive is explicitly specified or is clearly indicated by the context. For example, unless otherwise specified the condition "A or B is present" is met if (1) A is present and B is not present; (2) A is not present and B is present; or (3) A is present and B is present.

Some terms used in this application have special meanings, as defined herein. All other terms will be known to the skilled artisan, and are to be afforded the meaning that a person of skill in the art at the time of the invention would have given them.

"Independently," when used in reference to the identify of one or more variable elements, means that each occurrence of any of the variable elements may have the same or different identity, within the specified limitations, regardless of the identity of any other occurrence of the reference element. Thus, if there are two occurrences of element "E," and element E can be independently selected from identity A or identity B, each of the two occurrences of E can be either Y or Z, in any combination (e.g., YY, YZ, ZY, or ZZ).

"Wood veneer" refers to a thin layer of wood or plastic with a decorative or fine finish that is bonded to the surface of a less expensive material. The less expensive material can be, for example, wood. When plastic, the wood veneer can be plastic applique, for example, those obtainable under the trade designation Di NOC (3M Company, St. Paul, Minn., USA). Wood veneer can be a single layer (one ply) or more than one layer laminated together (multi-ply).

"On" when used in reference to the disposition of a layer relative to a substrate or another layer means that the layer is at least partially in contact with the reference layer or substrate. Thus, if layer A is "on" substrate B, at least a portion of layer A contacts at least a portion of substrate B.

"Soft" materials are primarily organic, amorphous, and can often be described as highly viscous fluids. Some soft materials can be defined in terms of their pencil hardness. Soft materials typically have a pencil hardness of H or less, for example, from B to H. Some soft materials have a pencil hardness no less than 4B, no less than 2B, no less than B, no less than HB, no less than F, or no less than H. Some soft materials have a pencil hardness no greater than H, no greater than F, no greater than HB, no greater than B, no greater than 2B, or no greater than 3B. Most soft materials used herein have a pencil hardness from HB to H.

"Hard" materials are materials with a hardness greater than that of soft materials. Some hard materials can be defined in terms of their pencil hardness. Hard materials typically have a pencil hardness of at least 3H. Some hard materials have a pencil hardness of at least 2H, at least 3H, at least 4H, at least 5H, at least 6H or at least 7H. Some hard materials have a pencil hardness of no more than 8H, no more than 7H, no more than 6H, no more than 5H, or no more than 4H. Most hard materials used herein have a pencil hardness from 4H to 6H.

"Aliphatic polyurethane" refers to a polyurethane having no aromatic groups, no carbon-carbon double bonds, and no carbon-carbon triple bonds.

"Wt %" means weight percent.

"Adhesion value" refers to the pressure needed to delaminate a layer or material of interest from an adjacent layer or material.

An article can include a wood veneer substrate, a substrate contacting layer on the wood veneer substrate, a middle layer on the substrate contacting layer, and a top layer on the middle layer.

When a wood substrate is used, the wood can be any wood. Typically, the wood is a type of wood that is decorative as well as functional. Examples include pine, maple, oak, cherry, rosewood (Brazilian, East Indian, etc.), spruce (sitka, Adirondack, etc.), mahogany, ebony, and the like.

When a wood veneer is used as the substrate the wood veneer can be natural or synthetic. Natural woods include any decorative or functional wood, such as pine, maple, oak, cherry, rosewood (Brazilian, East Indian, etc.), spruce (sitka, Adirondack, etc.), mahogany, ebony, and the like. Synthetic wood veneer includes synthetic wood-like products, such as those obtainable under the trade designation PERGO, as well as non-wood products covered with a wood-like applique, such as those obtainable under the trade designation DI-NOC from 3M Company (St. Paul, Minn., USA). The wood veneer can be in the form of thin plane of wood, which can have any thickness depending on the desired use but often has a thickness of 0.05 cm to 2 cm. Typical thicknesses are 2 cm or less, 1.5 cm or less, 1.25 cm or less, 1 cm or less, 0.75 cm or less, 0.5 cm or less, 0.25 cm or less, or 0.1 cm or less; typical thickness are also 0.05 cm or more, 0.1 cm or more, 0.25 cm or more, 0.5 cm or more, 0.75 cm or more, 1 cm or more, 1.25 cm or more, 1.5 cm or more, or 1.75 cm or more. The wood veneer can also be in the form of a cut or uncut piece of wood, which can have any thickness depending on the desired use but often has a thickness of 2 cm to 15 cm. Typical thicknesses can be greater than 2 cm, greater than 3 cm, greater than 4 cm, greater than 5 cm, greater than 6 cm, greater than 7 cm, greater than 8 cm, greater than 9 cm, greater than 10 cm, greater than 11 cm, greater than 12 cm, greater than 13 cm, or greater than 14 cm; typical thickness can also be less than 15 cm, less than 14 cm, less than 13 cm, less than 12 cm, less than 11 cm, less than 10 cm, less than 9 cm, less than 8 cm, less than 7 cm, less than 6 cm, less than 5 cm, less than 4 cm, or less than 3 cm.

The wood or wood veneer can have a surface with pores. Most often, when the wood veneer is natural wood, it will have pores on the surface. Some synthetic wood veneer can have a non-porous surface.

When wood veneer is used, it can be only a single layer (1-ply) or it can have multiple layers laminated together (multi-ply). Typical multi-ply wood veneers are 2-ply or 3-ply, although any wood veneer can be used. Similarly, when wood is used, it can be a single piece of wood or a wood laminate such as plywood.

The surface contacting layer comprises a soft polyurethane. The surface contacting layer can have a pencil hardness of H or less, for example, from B to H. Some surface contacting layers have a pencil hardness less than 4B, no less than 2B, no less than B, no less than HB, no less than F, or no less than H. Some surface contacting layers have a pencil hardness no greater than H, no greater than F, no greater than HB, no greater than B, no greater than 2B, or no greater than 3B. Most surface contacting layers used herein have a pencil hardness from HB to H. The hardness of the surface contacting layer is important because, contrary to prior attempts at coating wood veneer, the soft, low-modulus substrate contacting layer can deform as the wood veneer changes shape with temperature and humidity changes in the environment. Thus, employing surface contacting layers with the specified modulus reduces the prevalence of cracks in the coating as the coating ages.

The polyurethane can be any polyurethane that is suitable for coating wood veneer, so long as it is soft and provides the required properties. Exemplary polyurethanes can be the reaction product of one or more multiisocyanates with one or more polyols. Typical polyisocyanates that can be used include 2,5-toluene diisocyanate, 2,6-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5-tetraethyl) diphenylmethane, 4,4'-diisocyanato-3,3'-dimethoxybiphenyl (o-dianisidine diisocyanate), 5-chloro-2,4-toluene diisocyanate, m-xylylene diisocyanate, tetramethyl-m-xylylene diisocyanate, 1,4-diisocyanatobutane, 1,6-diisocyanatohexane, 1,12-diisocyanatododecane, 2-methyl-1,5-diisocyanatopentane, methylenedicyclohexylene-4,4'-diisocyanate, 3-isocyanatomethyl-3,5,5-trimethylcyclohexyl isocyanate, isophorone diisocyanate, 2,2,4-trimethylhexyl diisocyanate, cyclohexylene-1,4-diisocyanate, polyoxyalkylene terminated with two isocyanate-containing functional groups, polyester terminated with two isocyanate-containing functional groups, polybutadiene terminated with two isocyanate-containing functional groups, as well as polyisocyanates available under the trade designations MONDUR or DESMODUR (Bayer Corp. Pittsburgh, Pa., USA). Typically, the polyurethane is an aliphatic polyurethane. Most commonly, multiisocyanate resin based on hexamethylene isocyanate, such as those available under the trade designation DESMODUR, is used.

Typical polyols that can be used include those available under the trade designation DESMOPHEN from Bayer Corp. (Pittsburgh, Pa., USA) or K-FLEX from King Industries (Norwalk, Conn., USA). Polyester polyols can be used, for example those available under trade designations Desmophen 631A, 650A, 651A, 670A, 680, 110, and 1150. Polyether polyols, such as those available under the trade designations Desmophen 550U, 1600U, 1900U, and 1950U, can also be used. Acrylic polyols, such as those available under the trade designations Desmophen A160SN, A575, and A450BA/A, can also be used. Most commonly, polyester polyols are used. Typically, the polyols have a weight average molecular weight from 200 Daltons to 2,000 Daltons. Most commonly polyols with weight average molecular weights of 400 Daltons 800 Daltons are employed. Most commonly, polyols available under the trade designation K-FLEX, are used.

The surface contacting layer typically has a thickness of 25 microns to 125 microns. In many cases, the surface contacting layer has a thickness that is no less than 25 microns, no less than 30 microns, no less than 40 microns, no less than 50 microns, no less than 60 microns, no less than 70 microns, no less than 80 microns, no less than 90 microns, no less than 100 microns, no less than 110 microns, or no less than 120 microns.

In addition to the polyurethane, the substrate contacting layer can contain one or more additives. Exemplary additives include fire retardants and UV absorbers.

Fire retardants include materials that reduce the risk of the coating or the underlying veneer catching fire. Any fire retardant known in the art can be used, so long as it does not interfere with the other properties of the substrate contacting layer. Exemplary fire retardants include inorganic fire retardants and organic fire retardants. Inorganic fire retardants include aluminum trihydrate and magnesium hydroxide (both of which are commercially available from, for example, the J. M. Huber Corporation (Edison, N.J., USA), as well as zinc borate, which is commercially available from, for example, US Borax Corporation (Greenwood Village, Colo., USA). Fire retardant nano-clays and nano-tubes are also useable as inorganic fire retardants. Organic fire retardants include polymeric and non-polymeric halogenated fire retardant, such as those available under the trade designations FR-522 and FR-513 from ICL Performance Products (St. Louis, Mo., USA). Phosphorous containing fire retardants, which can be organic or inorganic, can also be used. Such fire retardants include those available under the trade designation LEVAGARD from Lanxess (Cologne, Germany), FYROL from ICL Industrial Products (Amsterdam, Netherlands) and EXOLIT from Clariant AG (Muttenz, Switzerland). When employed, fire retardants are typically present from 5 wt % to 30 wt %, most commonly from 10 wt % to 15 wt %.

UV absorbers include substances that absorb UV radiation to reduce the aging or yellowing of the substrate contacting layer. Exemplary UV absorbers include hindered amines, tocopherol, benzophenone, benzotriazole, modified benzotriazoles, and triazines. Hindered amines, such as those available under the trade designation TINUVIN, are commonly used. When employed, UV absorbers are typically used in amounts from 1 wt % to 8 wt %, most commonly 2 wt % to 4 wt %.

In some cases, the substrate contacting layer can also contain a residual amount of a catalyst. The catalyst can be employed to polymerize the polyurethane, and in many cases does not need to be removed from the substrate contacting layer in order to achieve the desired properties. Catalysts that facilitate polyurethane polymerization are known in the art, and include, zinc catalysts, tin catalysts, zirconium catalysts, and the like. Some exemplary catalyst is available under the trade designation KCat (King Industries, Inc., Norwalk, Conn., USA). When present, the amount of residual catalyst will depend on the amount of catalyst used to polymerize the polyurethane. When present, the typical amounts of residual catalyst in the substrate contacting layer are from 0.01 wt % to 1 wt %.

The substrate contacting layer can be applied to the wood or wood veneer by any suitable method. Exemplary methods include dip coating, spray coating, rod coating, and knife coating. Typically, the substrate contacting layer is formed directly on the wood veneer. A precursor solution or dispersion of polyurethane forming monomers or oligomers, which can also contain polymerization catalyst, if used, as well as any fire retardant and UV absorbers that are being used, can be coated onto the wood veneer. The solution or dispersion can be in water, an organic solvent, or a mixture of water and organic solvent. Typical organic solvents include hexanes, turpentine, ethyl acetate, butyl acetate, acetone, methyl ethyl ketone, ethanol, 2-ethylhexyl acetate, ethylene glycol diacetate, isobutyl acetate, n-butyl propionate, n-propyl propionate, propylene glycol monomethyl ether acetate, diethylene glycol monobutyl ether acetate, methyl isoamyl ketone, propylene glycol monomethyl ether, ethyl 3-ethoxypropionate, p-chlorobenzotrifluoride, and butyl acetate. Butyl acetate is most commonly employed.

The substrate contacting layer can subsequently be cured, typically by thermal curing. When this method is used to apply the substrate contacting layer to a porous surface of the wood veneer, the substrate contacting layer can penetrate into at least some of the pores of the wood veneer. By penetrating into the pores of the wood veneer, the substrate contacting layer can have excellent adhesion properties and avoid delamination. However, even when the wood veneer is not porous, suitable adhesion properties can be achieved.

The adhesion of the coating to the veneer is typically greater than the adhesion between the wood veneer and any surface to which the wood veneer has been bonded, greater than the internal strength of the wood veneer, or both. By selecting such an adhesion, the wood veneer substrate will either experience cohesive failure or delamination from the surface to which it is bonded before surface contacting layer can delaminate from the wood veneer. Depending on the nature of the wood veneer, a pressure of 1350 kPa is often sufficient to cause cohesive failure. This value, however, depends on the nature of the wood veneer. For example, wood veneer having a coarser less tightly knit grain will fail more easily than a finer, closed grain construction. Thus, in order to achieve an adhesion value that is greater than the adhesion between the wood veneer and the surface to which it is bonded, the adhesion value typically ranges from 1700 kPa to 4150 kPa. Typical adhesion values are no less than 1700 kPa, no less than 1800 kPa, no less than 2000 kPa, no less than 2250 kPa, no less than 2500 kPa, no less than 2750 kPa, no less than 3000 kPa, no less than 3250 kPa, no less than 3500 kPa, no less than 3750 kPa, or no less than 4000 kPa. Typical adhesion values are also no greater than 3500 kPa, no greater than 3250 kPa, no greater than 3000 kPa, no greater than 3000 kPa, no greater than 2750 kPa, no greater than 2500 kPa, no greater than 2250 kPa, or no greater than 2000 kPa. Most commonly, the adhesion value is from 1700 kPa to 3500 kPa.

The middle layer can include a soft polyurethane. The soft polyurethane can provide the middle layer with a pencil hardness of H or less, for example, from B to H. Some surface contacting layers have a pencil hardness no less than 4B, no less than 2B, no less than B, no less than HB, no less than F, or no less than H. Some middle layers have a pencil hardness no greater than H, no greater than F, no greater than HB, no greater than B, no greater than 2B, or no greater than 3B. Most middle layers used herein have a pencil hardness from HB to H. Thus, the middle layer provides an additional thickness of soft, lower pencil hardness coating. This additional thickness of soft coating can be helpful in mitigating cracking in the coating, particularly the top layer, in view of the natural tendency of wood veneer to expand or contract in response to changes in the environment, such as at least one of temperature, humidity, or pressure.

The polyurethane can be any polyurethane that is suitable for coating wood veneer, so long as it is soft and provides the required properties. Exemplary polyurethanes can be the reaction product of one or more multiisocyanates with one or more polyols. Typical polyisocyanates that can be used include 2,5-toluene diisocyanate, 2,6-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5-tetraethyl) diphenylmethane, 4,4'-diisocyanato-3,3'-dimethoxybiphenyl (o-dianisidine diisocyanate), 5-chloro-2,4-toluene diisocyanate, m-xylylene diisocyanate, tetramethyl-m-xylylene diisocyanate, 1,4-diisocyanatobutane, 1,6-diisocyanatohexane, 1,12-diisocyanatododecane, 2-methyl-1,5-diisocyanatopentane, methylenedicyclohexylene-4,4'-diisocyanate, 3-isocyanatomethyl-3,5,5-trimethylcyclohexyl isocyanate, isophoroone diisocyanate, 2,2,4-trimethylhexyl diisocyanate, cyclohexylene-1,4-diisocyanate, polyoxyalkylene terminated with two isocyanate-containing functional groups, polyester terminated with two isocyanate-containing functional groups, polybutadiene terminated with two isocyanate-containing functional groups, as well as polyisocyanates available under the trade designations MONDUR or DESMODUR (Bayer Corp. Pittsburgh, Pa., USA). Typically, the polyurethane is an aliphatic polyurethane. Most commonly, multiisocyanate resin based on hexamethylene isocyanate, such as those available under the trade designation DESMODUR, is used.

Typical polyols that can be used include those available under the trade designation DESMOPHEN from Bayer Corp. (Pittsburgh, Pa., USA) or K-FLEX from King Industries (Norwalk, Conn., USA). Polyester polyols can be used, for example those available under trade designations Desmophen 631A, 650A, 651A, 670A, 680, 110, and 1150. Polyether polyols, such as those available under the trade designations Desmophen 550U, 1600U, 1900U, and 1950U, can also be used. Acrylic polyols, such as those available under the trade designations Desmophen A160SN, A575, and A450BA/A, can also be used. Most commonly, polyester polyols are used. Typically, the polyols have a weight average molecular weight from 200 Daltons to 2,000 Daltons. Most commonly polyols with weight average molecular weights of 400 Daltons 800 Daltons are employed. Most commonly, polyols available under the trade designation K_FLEX, are used.

The middle layer typically has a thickness that is similar to or greater than the thickness of the substrate contacting layer. In most cases, the middle layer is somewhat thicker than the substrate contacting layer. Typically, the middle layer has a thickness of 100 microns to 250 microns. In many cases, the middle layer has a thickness that is no less than 100 microns, no less than 110 microns, no less than 120 microns, no less than 130 microns, no less than 140 microns, no less than 150 microns, no less than 160 microns, no less than 170 microns, no less than 180 microns, no less than 190 microns, no less than 200 microns, no less than 210 microns, or no less than 220 microns. In many cases, the middle layer has a thickness that is no greater than 250 microns, no greater than 240 microns, no greater than 230 microns, no greater than 220 microns, no greater than 210 microns, no greater than 200 microns, no greater than 190 microns, no greater than 180 microns, no greater than 170 microns, no greater than 160 microns, no greater than 150 microns, no greater than 140 microns, no greater than 130 microns, or no greater than 120 microns.

The middle layer typically provides additional thickness of soft coating below the hard top layer. This additional thickness can contribute to the overall stability of the coating, for example, by permitting the wood veneer to expand and contract with changes in the environment without the cracking that can be associated with a hard coating. Also, the total thickness of soft layers (that is, the middle and substrate contacting layers combined) can absorb sufficient energy from any wood veneer deformation so as to minimize cracking of the coating, and particularly of the top layer of the coating.

In addition to the polyurethane, the middle layer can contain one or more additives. Exemplary additives include fire retardants and UV absorbers. The additives, such as fire retardants and UV absorbers, can be the same as those discussed above with respect to the substrate contacting layer. The amounts of such additives can also be the same as those discussed above with respect to the substrate contacting layer.

In addition to the above mentioned additives, the middle layer can include a stain or pigment to impart color. Any stain or pigment suitable for use with wood or wood veneer coatings can be used. Many of such stains and pigments are known to the artisan, and can be obtained commercially from companies including Sherwin-Williams (Cleveland, Ohio, USA), PPG Industries (Pittsburgh, Pa., USA), Mohawk Finishing Products (Hickory, N.C., USA), PENN Color (Doylestown, Pa., USA), Keystone Aniline Corp. (Inman, S.C., USA), etc.

Typically, the stain or pigment is used in amounts from 0.5 wt % to 3 wt % in the middle layer. However, the amount of the stain or pigment depends on the desired appearance of the coating and therefore more or less can also be used depending on the particular end use and desired cosmetic effect.

Matting agents can also be used in the middle layer to reduce the gloss of the coatings appearance. This is sometimes known as providing a satin or matt appearance. Suitable matting agents are known, and include those available under the trade designation ACEMATT from Evonik Industries (Essen, Germany). ACEMATT TS100 and ACEMATT 3300 are commonly used. When employed, the amount of the matting agent can be varied depending on the desired appearance. Typical amounts are from 1 wt % to 3 wt %.

The middle layer can, in some cases, contain a residual amount of catalyst. The type and amounts of such residual catalyst can be the same as those discussed above with respect to the substrate contacting layer.

Most commonly, the middle layer is applied to the substrate contacting layer after the substrate contacting layer has dried or cured, although this is not required. For example, the middle layer and substrate contacting layer often contain the same components (though this is not required), in which case it may not be necessary to allow the substrate contacting layer to dry or cure before applying the middle layer. In such cases, the middle layer and the substrate contacting layer may not be discrete layers.

The middle layer can be applied by any suitable method. Exemplary methods include dip coating, spray coating, rod coating, and knife coating. Typically, the middle layer will be formed directly on the substrate contacting layer. A precursor solution or dispersion of polyurethane forming monomers or oligomers, which can also contain polymerization catalyst, if used, as well as any fire retardant and UV absorbers that are being used, can be coated onto the wood veneer. The solution or dispersion can be in water, an organic solvent, or a mixture of water and organic solvent. Typical organic solvents include those discussed above with respect to the substrate contacting layer. The coating can subsequently be cured, typically by thermal curing.

The top layer is typically a hard coating. The top coating typically has a pencil hardness of at least 3H. Some top layers have a pencil hardness of at least 2H, at least 3H, at least 4H, at least 5H, at least 6H or at least 7H. Some top layers have a pencil hardness of no more than 8H, no more than 7H, no more than 6H, no more than 5H, or no more than 4H. Most top layers used herein have a pencil hardness from 4H to 6H.

The top layer can be any suitable hard coating that provides the desired characteristics. Typical top layers often contain one or more polymers that form a hard coating when cured. Exemplary polymers include polyurethanes, such as aliphatic polyurethanes, polyacrylates, and polyureas.

Exemplary polyurethanes can be the reaction product of one or more multiisocyanates with one or more polyols. The polyurethane can be any polyurethane that is suitable for coating wood veneer, so long as it is soft and provides the required properties. Exemplary polyurethanes can be the reaction product of one or more multiisocyanates with one or more polyols. Typical polyisocyanates that can be used include 2,5-toluene diisocyanate, 2,6-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5-tetraethyl) diphenylmethane, 4,4'-diisocyanato-3,3'-dimethoxybiphenyl (o-dianisidine diisocyanate), 5-chloro-2,4-toluene diisocyanate, m-xylylene diisocyanate, tetramethyl-m-xylylene diisocyanate, 1,4-diisocyanatobutane, 1,6-diisocyanatohexane, 1,12-diisocyanatododecane, 2-methyl-1,5-diisocyanatopentane, methylenedicyclohexylene-4,4'-diisocyanate, 3-isocyanatomethyl-3,5,5-trimethylcyclohexyl isocyanate, isophorone diisocyanate, 2,2,4-trimethylhexyl diisocyanate, cyclohexylene-1,4-diisocyanate, polyoxyalkelene terminated with two isocyanate-containing functional groups, polyester terminated with two isocyanate-containing functional groups, polybutadiene terminated with two isocyanate-containing functional groups, as well as polyisocyanates available under the trade designations MONDUR or DESMODUR (Bayer Corp. Pittsburgh, Pa., USA). Typically, the polyurethane is an aliphatic polyurethane. Most commonly, multiisocyanate resin based on hexamethylene isocyanate, such as those available under the trade designation DESMODUR, is used.

Typical polyols that can be used include those available under the trade designation DESMOPHEN from Bayer Corp. (Pittsburgh, Pa., USA) or K-FLEX from King Industries (Norwalk, Conn., USA). Polyester polyols can be used, for example those available under trade designations Desmophen 631A, 650A, 651A, 670A, 680, 110, and 1150. Polyether polyols, such as those available under the trade designations Desmophen 550U, 1600U, 1900U, and 1950U, can also be used. Acrylic polyols, such as those available under the trade designations Desmophen A160SN, A575, and A450BA/A, can also be used. Most commonly, polyester polyols are used. Typically, the polyols have a weight average molecular weight from 200 Daltons to 2,000 Daltons. Most commonly polyols with weight average molecular weights of 400 Daltons 800 Daltons are employed. Most commonly, polyols available under the trade designation K-FLEX, are used.

Exemplary polyacrylates include homopolymers and copolymers of poly(acrylic acid) or its esters, particularly its alkyl esters, poly(methyl methacrylate) or its esters, particularly its alkyl esters, and the like. Specific polyacrylates that can be used include homopolymers and copolymers comprising polymerized forms of one or more of acrylic acid, methacrylic acid, methyl methacrylate, and butyl acrylate. Exemplary acrylate polymers that can be used are those obtainable under the trade designations SETAQUA, particularly SETAQUA 6782 and SETAQUA 6522 from Nuplex (St. Louis, Ill., USA), hydroxyl acrylic emulsions available under the trade designations XK190 and XP 555 from DSM (Netherlands), Exemplary polyureas include aliphatic polyureas. Most commonly, the aliphatic polyurea is a polyaspartic, that is, the condensation product of an aspartic acid ester and a polyisocyanate.

The top layer can also include one or more additives. The additives can be, for example, pigments, matting agents, fire retardants or UV absorbers. The fire retardants and UV absorbers can be the same fire retardants and UV absorbers discussed above with respect to the substrate contacting layer, and can be used in the same amounts and manner as discussed with respect to the substrate contacting layer. The pigments and matting agents can be the same as those discussed above with respect to the middle layer, and can be used in the same amounts and manner as discussed with respect to the middle layer.

Most commonly, the top layer is applied to the middle layer after the substrate contacting layer has dried or cured, although this is not required The top can be applied by any suitable method. Exemplary methods include dip coating, spray coating, rod coating, and knife coating. Typically, the top layer will be formed directly on the middle layer. A precursor solution or dispersion containing monomers or oligomers that can polymerize or cure to form the top layer, which can also contain polymerization catalyst, if used, as well as any fire retardant and UV absorbers that are being used, can be coated onto the wood veneer panel. The solution or dispersion can be in water, an organic solvent, or a mixture of water and organic solvent. Typical organic solvents include those mentioned above with respect to the substrate contacting layer. The coating can subsequently be cured, typically by thermal curing.

The substrate contacting layer, middle layer, and top layer in combination can constitute a coating. The coating can be optically clear. Optically clear is often defined in terms of a human observer having normal eyesight (with corrective lenses, if needed) being able to observe the grain of the underlying wood veneer without any significant distortion in resolution or color when compared with an observation of the same wood veneer at the same distance without the coating. A reasonable amount of additional gloss, glare, or matte character can be imparted to the wood veneer without being a significant distortion. Optically clear can also be defined in terms of haze %. Haze % is defined in ASTM D1003, and can be measured as specified in ASTM D1003 Procedure B (that is, with a spectrophotometer as opposed to with a haze meter). Optically clear coatings measured with a spectrophotometer according to this procedure can have a measured haze % of 30 or less, such as 25 or less, 20 or less, 15 or less, 10 or less, 5 or less, 2% or less, or even 1% or less. Alternatively, haze % can be measured according to ASTM D1003 Procedure A (that is, with a haze meter). Optically clear coatings measured with a haze meter according to this procedure can have a measured haze % of 30 or less, such as 25 or less, 20 or less, 15 or less, 10 or less, 5 or less, 2% or less, or even 1% or less. Optically clear can also be defined in terms of the transmissivity of the coating. In some cases, the coating can transmit at least a particular percentage of light in the visible range, such as between 400 and 800 nm. In some cases, at least 70%, at least 75%, at least 80%, at least 85%, at least 90%, at least 95%, at least 97% or at least 99% of such light is transmitted by the coating.

Instead of being optically clear, the coating can be pigmented or contain a stain. Pigments or stains, if used, are typically present in the middle layer, as described above, but can be in one or more of the other layers in addition to or in place of being in the middle layer. When a lower gloss is desired, matting agents can be used. Such matting agents are typically in the middle layer, but can be in one or more of the other layers in addition to or in place of being in the middle layer.

Additional layers can be present on top of the top layer, although they are not required unless otherwise indicated. Such additional layers can include one or more of a paint layer, a hard coat layer, a clear coat layer, a protective layer, and the like. In most cases, such additional layers are not needed, because the substrate contacting layer, middle layer, and top layer can provide good protection and aesthetic appearance without the need for additional layers. However, it is possible, for example, to change the appearance of the coating described herein by applying a paint layer on top of it.

Many of the articles described herein are capable of self-healing, and the coating as described herein can in many cases provide self-healing properties. Thus, the coating is damaged, such as scratched or dented, the scratch or dent can partially or completely repair itself over time. Self-healing can be facilitated or accelerated by, for example, heating the damaged area. Such heating can be accomplished at low temperatures, for example about 40° C., with a commercial hair dryer.

The articles described herein can also have a backing component, which is the substance to which the wood veneer is bonded. The backing component is typically an inexpensive material or a material that is not aesthetically pleasing. Wood is a common backing component.

Turning to the Figures, FIG. 1 depicts article 100. Article 100 includes wood substrate 110, having a rough or porous surface. Substrate contacting layer 120 extends into the pores of wood substrate 110 and also provides some thickness above those pores. Middle layer 130 is on substrate contacting layer 120, and top layer 140 is on middle layer 130.

Figure 2:
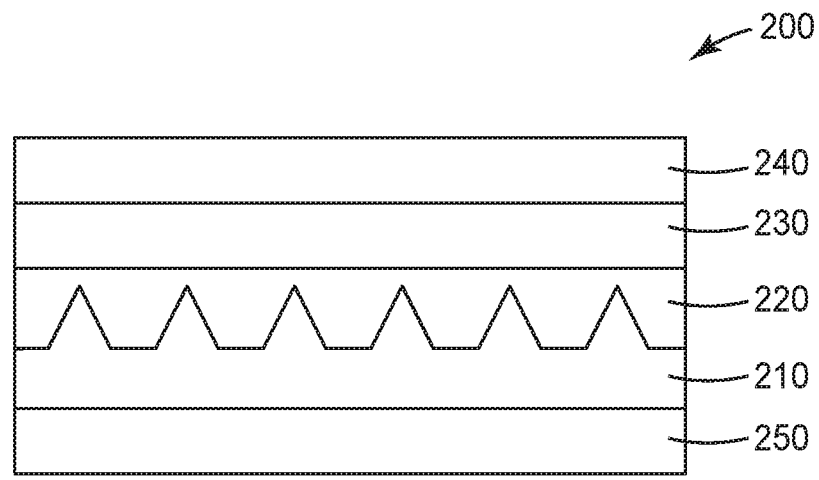
FIG. 2 is a schematic of an article having an inexpensive material covered with a wood veneer panel, the wood veneer panel having with a substrate contacting layer on the veneer panel, a middle layer on the substrate contacting layer, and a top layer on the middle layer

FIG. 2 depicts article 200. Article 200 includes a backing component 250, which is made of inexpensive wood and to which is bonded a layer of wood veneer 210. Substrate contacting layer 220 extends into the pores of wood substrate 210 and also provides some thickness above pores of the wood veneer 210. Middle layer 230 is on substrate contacting layer 220, and top layer 240 is on middle layer 230.

Any of the articles discussed herein can be a component of another article. For example, the articles disclosed herein can be a component of any article that contains wood veneer, typically for aesthetic purposes. Examples include furniture, such as a cabinet, a shelf, a desk, a chair, a stool, or a table, a panel, which can be a component of furniture, wall coverings, steering wheels, such as on a car, boat, or airplane, decorative panels, such as on a car, boat, or airplane, musical instruments, such as pianos or guitars, or a frame, such as a picture frame.

LIST OF ILLUSTRATIVE EMBODIMENTS

The following embodiments are listed to illustrate particular features, and are not intended to be limiting unless otherwise stated.

Embodiment 1

An article comprising:
a wood veneer substrate;
a substrate contacting layer on the wood veneer substrate, wherein the substrate contacting layer is soft and has a thickness of 25 micrometers to 125 micrometers as measured from surface of the wood veneer to the outermost surface of the substrate contacting layer;
a middle layer on the substrate contacting layer, the middle layer comprising polyurethane, wherein the middle layer is soft and has a thickness of 100 micrometers to 250 micrometers; and
a top layer on the middle layer, wherein the top layer is hard, and has a thickness of 100 to 250 micrometers.

Embodiment 1a

The article of embodiment 1 wherein the wood or wood veneer substrate is wood.

Embodiment 1b

The article of embodiment 1, wherein the wood or wood veneer substrate is wood veneer.

Embodiment 1c

The article of embodiment 1b, wherein the wood veneer is natural wood.

Embodiment 1d

The article of embodiment 1b, wherein the wood veneer is plastic.

Embodiment 2

The article of embodiment 1, wherein the top layer comprises at least one acrylic polymer, aspartic ester polymer, or polyurethane.

Embodiment 3

The article of embodiment 1 or 2, wherein the top layer comprises at least one acrylic polymer.

Embodiment 4

The article of embodiment 1 or 2, wherein the top layer comprises at least one aspartic ester polymer.

Embodiment 5

The article of embodiment 1 or 2, wherein the top layer comprises at least one polyurethane.

Embodiment 6

The article of any preceding embodiment, wherein the top layer has a pencil hardness of at least 2H.

Embodiment 7

The article of any preceding embodiment, wherein the top layer has a pencil hardness of at least 3H.

Embodiment 8

The article of any preceding embodiment, wherein the top layer has a pencil hardness of at least 4H.

Embodiment 9

The article of any preceding embodiment, wherein the top layer has a pencil hardness of at least 5H.

Embodiment 10

The article of any preceding embodiment, wherein the top layer has a pencil hardness no greater than 6H.

Embodiment 11

The article of any preceding claims, wherein the wood veneer substrate has a surface comprising pores and the substrate contacting layer penetrates into at least some of the pores of the wood veneer substrate.

Embodiment 12

The article of any preceding embodiment, wherein the substrate contacting layer has a pencil hardness from HB to H.

Embodiment 13

The article of any preceding embodiment, wherein the substrate contacting layer has a pencil hardness no greater than F.

Embodiment 14

The article of any preceding embodiment, wherein the substrate contacting layer has a pencil hardness no greater than HB.

Embodiment 15

The article of any preceding embodiment, wherein the substrate contacting layer has a pencil hardness no greater than B.

Embodiment 16

The article of any preceding embodiment, wherein the substrate contacting layer has a pencil hardness no greater than 2B.

Embodiment 17

The article of any preceding embodiment, wherein the substrate contacting layer has a pencil hardness no greater than 3B.

Embodiment 18

The article of any preceding embodiment, wherein the substrate contacting layer has a pencil hardness no greater than 4B.

Embodiment 19

The article of any preceding embodiment, wherein the substrate contacting layer has a pencil hardness no less than H.

Embodiment 20

The article any preceding embodiment, wherein the polyurethane middle layer has a pencil hardness from HB to H.

Embodiment 21

The article of any preceding embodiment, wherein the adhesion value of the substrate contacting layer to the wood veneer is at least 1700 kPa.

Embodiment 22

The article of any preceding embodiment, wherein the adhesion value of the substrate contacting layer to the wood veneer is at least 1800 kPa.

Embodiment 23

The article of any preceding embodiment, wherein the adhesion value of the substrate contacting layer to the wood veneer is at least 1900 kPa.

Embodiment 24

The article of any preceding embodiment, wherein the adhesion value of the substrate contacting layer to the wood veneer is at least 2000 kPa.

Embodiment 25

The article of any preceding embodiment, wherein the adhesion value of the substrate contacting layer to the wood veneer is at least 2250 kPa.

Embodiment 26

The article of any preceding embodiment, wherein the adhesion value of the substrate contacting layer to the wood veneer is at least 2500 kPa.

Embodiment 27

The article of any preceding embodiment, wherein the adhesion value of the substrate contacting layer to the wood veneer is at least 2750 kPa.

Embodiment 28

The article of any preceding embodiment, wherein the adhesion value of the substrate contacting layer to the wood veneer is at least 3000 kPa.

Embodiment 29

The article of any preceding embodiment, wherein the adhesion value of the substrate contacting layer to the wood veneer is at least 3250 kPa.

Embodiment 30

The article of any preceding embodiment, wherein the adhesion value of the substrate contacting layer to the wood veneer is at least 3500 kPa.

Embodiment 31

The article of any preceding embodiment, wherein the adhesion value of the substrate contacting layer to the wood veneer is at least 3750 kPa.

Embodiment 32

The article of any preceding embodiment, wherein the adhesion value of the substrate contacting layer to the wood veneer is at least 4000 kPa.

Embodiment 33

The article of any preceding embodiment, wherein the adhesion value of the substrate contacting layer to the wood veneer is no more than 4150 kPa.

Embodiment 34

The article of any preceding embodiment, wherein the adhesion value of the substrate contacting layer to the wood veneer is no more than 4000 kPa.

Embodiment 35

The article of any preceding embodiment, wherein the adhesion value of the substrate contacting layer to the wood veneer is no more than 3750 kPa.

Embodiment 36

The article of any preceding embodiment, wherein the adhesion value of the substrate contacting layer to the wood veneer is no more than 3500 kPa.

Embodiment 37

The article of any preceding embodiment, wherein the adhesion value of the substrate contacting layer to the wood veneer is 1700 kPa to 4150 kPa.

Embodiment 38

The article of any preceding embodiment, wherein the polyurethane in the substrate contacting layer is the reaction product of a polyester polyol and a branched polyisocyanate.

Embodiment 39

The article of any preceding embodiment, wherein the polyurethane in the middle layer is the reaction product of a polyester polyol and a branched polyisocyanate.

Embodiment 40

The article of any preceding embodiment, wherein polyurethane in the substrate contacting layer is an aliphatic polyurethane.

Embodiment 41

The article of any preceding embodiment, wherein polyurethane in the middle layer is an aliphatic polyurethane.

Embodiment 42

The article of any preceding embodiment, wherein the substrate contacting layer further comprises a fire retardant.

Embodiment 43

The article of any preceding embodiment, wherein the substrate contacting layer further comprises a UV absorber.

Embodiment 44

The article of any preceding embodiment, wherein the middle layer further comprises a fire retardant.

Embodiment 45

The article of any preceding embodiment, wherein the middle layer further comprises a UV absorber.

Embodiment 46

The article of any preceding embodiment, wherein the middle layer further comprises a stain or pigment.

Embodiment 47

The article of any preceding embodiment, wherein the middle layer further comprises a matting agent.

Embodiment 48

An article of any of embodiments 1-46, wherein the substrate contacting layer, the middle layer, and the top layer constitute a coating, and the coating is optically clear.

Embodiment 49

The article of any preceding embodiment, wherein the article is a component of furniture, a steering wheel, a boat, a car, an airplane, a musical instrument, or a frame.

EXAMPLES

List of Materials

| | | |
|---|---|---|
| K Flex K188 | Polyester polyol | King Industries, Inc., Norwalk, CT |
| K Flex XM 337 | Polyester polyol | King Industries, Inc., Norwalk, CT |
| Tinuvin 1130 | UV Absorber | BASF Corporation, Wyandotte, MI |
| Tinuvin 292 | Hindered Amine Light Stabilizer | BASF Corporation, Wyandotte, MI |
| FR-513 | Flame Retardant | ICL Industrial Products, Tel Aviv, Israel |
| n-Butyl Acetate, Urethane Grade | Solvent | The Dow Chemical Company, Midland, MI |
| K Cat 4205 | Catalyst | King Industries, Inc., Norwalk, CT |
| Zoldine MS-Plus | Moisture Scavenger | Angus Chemical Company, Buffalo Grove, IL |
| Novec ™ 4432 | Fluorosurfactant | 3M Company, St. Paul, MN |
| Turboset Ultra Pro | Polyurethane Dispersion | Lubrizol Advanced Materials, Cleveland, OH |
| Tego Foamex 845 | Defoamer | Evonik Industries, Essen, Germany |
| Butyl Carbitol ™ | Solvent | The Dow Chemical Company, Midland, MI |
| Byk 349 | Surfactant | BYK-Chemie GmbH, Wesel, Germany |
| Byk 3410 | Wetting Agent | BYK-Chemie GmbH, Wesel, Germany |
| Desmodur N3300 A | Crosslinker | Bayer Material Science LLC Pittsburgh, Pennsylvania |
| Polyester ZMP 7773 | Polymer | Duro-Lak Inc, Laval, Quebec |
| Catalyst 3498A | Catalyst | Duro-Lak Inc, Laval, Quebec |
| Hardener 3499B | Hardener | Duro-Lak Inc, Laval, Quebec |
| ZMP-693A | Resin | Duro-Lak Inc, Laval, Quebec |
| ZMP-666B | Hardener | Duro-Lak Inc, Laval, Quebec |
| DS-61 | Solvent | Duro-Lak Inc, Laval, Quebec |
| Envirogem AD01 | Surfactant | Air Products and Chemicals, Inc. Allentown, PA |
| Bayhydrol A2695 | Acrylic Polyol | Bayer Material Science LLC Pittsburgh, Pennsylvania |
| Bayhydur XP 2655 (80% in MPA) | Isocyanate | Bayer Material Science LLC Pittsburgh, Pennsylvania |
| K-KAT 6212 | Catalyst | King Industries, Inc., Norwalk, CT |
| Tego Flow 425 | Wetting Agent | Evonik Industries, Essen, Germany |
| Tinuvin 5151 | UV Absorber | BASF Corporation, MI |

-continued

| | | |
|---|---|---|
| Tinuvin 123-DW | Hindered Amine Light Stabilizer | BASF Corporation, MI |
| Borchigel LW 44 (50% in water) | Thickener | Borchers, OMG, Inc. OH USA |
| Levagard TEP-Z | Flame Retardant | LANXESS Corporation, Cologne Germany |

Preparation 1

Into a 1 L Tripour beaker was weighed n-butyl acetate (160.99 g) and FR-513 (3.46 g). The contents were stirred with an overhead mixer at 200 rpm, for five minutes, to effect dissolution of the FR-513. K-Flex K188 (19.5 g) was added to the solution, followed by stirring at 300 rpm for five minutes. K-Flex XM337 (12.99 g) was then added to the Tripour and the contents stirred at 300 rpm for five minutes. The following components were added sequentially while stirring at 300 rpm: Tinuvin 1130 (0.68 g), Tinuvin 292 (0.34 g), K Cat 4205 (0.68 g), and Zoldine (1.36 g).

Into a 100 mL Tripour beaker was weighed 50.0 g of Coating 1 Part A. Desmodur N3300 A (7.35 g) was then measured into the beaker. The contents were stirred with a wooden stir stick until the contents appeared homogenous and transparent.

This coating was spray applied to a veneer panel to achieve a final dry film thickness of 100 microns.

Preparation 2

Into a 1 L Tripour beaker was weighed n-butyl acetate (97.39 g) and FR-513 (9.00 g). The contents were stirred with an overhead mixer at 200 rpm, for five minutes, to effect dissolution of the FR-513. K-Flex K188 (51.05 g) was added to the solution, followed by stirring at 300 rpm for five minutes. K-Flex XM337 (34.02 g) was then added to the Tripour and the contents stirred at 300 rpm for an additional five minutes. The following components were added sequentially while stirring at 300 rpm: Tinuvin 1130 (1.89 g), Tinuvin 292 (0.86 g), K Cat 4205 (1.84 g), Zoldine (3.62 g), and Novec 4432 (0.34 g).

Into a 100 mL Tripour beaker was weighed 50.0 g of Coating 2 Part A. Desmodur N3300 A (19.13 g) was then measured into the beaker. The contents were stirred with a wooden stir stick until the contents appeared homogenous and transparent.

This coating was spray applied to a veneer panel to achieve a final dry film thickness of 200 microns.

Preparation 3

Into a 250 mL Tripour beaker was weighed Turboset Ultra Pro (81.40 g), deionized water (9.70 g), and Tego Foamex 845 (0.11 g). The contents were stirred at 100 rpm with an overhead stirrer for ten minutes. The following components were added to the Tripour while maintaining stirring: deionized water (4.29 g), butyl carbitol (4.27 g), BYK 349 (0.10 g) and BYK 3410 (0.10 g). The contents were stirred for an additional 20 minutes prior to use.

This coating was spray applied to a veneer panel to achieve a final dry film thickness of 50 microns.

Preparation 4

The formulation was prepared by weighing ZMP 693A (2 parts) and combining with ZMP 666B. The formulation was applied to veneer with an Iwata LPH 400 spray gun to achieve a dry-film thickness of 100 microns.

Preparation 5

The formulation was prepared by sequentially weighing ZMP 7773 (1 part), Catalyst 3498A (2.50%), Hardener 3499B (2.50%), and solvent DS61 (10-20%). This coating was spray applied to a veneer panel to achieve a final dry film thickness of 200 microns.

Preparation 6

The formulation was prepared through sequential addition of ZMP 7773 (1 part), Catalyst 3498A (2.50%), Hardener 3499B (2.50%), and solvent DS61 (40%). This coating was spray applied to a veneer panel to achieve a final dry film thickness of 200 microns.

Preparation 7

To prepare Part A, 81.18 g of Bayhydrol A 2695 was weighed into a 250 ml Tripour beaker. The beaker was placed under the overhead mixer and stirred at 400 RPM. To the Bayhydrol A 2695, 37.80 g of water, 2.88 g of Envirogem AD01, and 1.26 g of Tego Flow 425 was added. In a small mixing cup 9.0 g of water and 9.0 g of Levagard TEP-Z are weighed and 1.80 g of Tinuvin 5151 and 0.90 g of Tinuvin 123-DW were weighed and added. These four materials were mixed by hand and added to the Bayhydrol A 2695 beaker and allowed to stir. In another small mixing cup, a 50% mixture of Borchigel LW 44 and water was prepared and stirred by hand. 0.47 g of this mixture was added to the Bayhydrol A 2695 beaker and all materials were left to stir for approximately 5 minutes.

To prepare part B, 26.25 g of Baydydur XP 2655 was mixed with 6.56 g of methoxypropyl acetate (MPA) to create an 80% solution of isocyanate in solvent. To this mixture 1.48 g of K-KAT 6212 was added. Part B is mixed by hand until a homogenous mixture is obtained.

The formulation of this preparation was prepared by adding Part B to Part A and mixed by hand for approximately 30 seconds. The coating was put into a 200 ml spray cup liner and sprayed onto veneer panels to provide a dry film thickness of 200 microns. After a one hour open time the panels were placed in the oven at 38° C.

Preparation of Coated Veneer Panels

A series of five veneer panels measuring 12 inches by 12 inches were coated with the preparations as shown in Table 1. All preparations were sprayed onto ebony recon wood veneer panels (3-ply, 1.8 mm thickness) which were bonded to ATR honeycomb panels (1.34 cm thickness) to achieve the specified dry thicknesses. The comparative example differs from the Examples because whereas Examples 1-4 each use soft layers for the substrate contacting layer and middle layer, whereas CE 1 uses hard layers for these layers.

TABLE 1

Examples 1-4 and Comparative Example 1

| Example | Substrate Contacting Layer (thickness, microns) | Middle Layer (thickness, microns) | Top Layer (thickness, microns) |
|---|---|---|---|
| 1 | Preparation 1 (100) and Preparation 3 (50) | Preparation 2 (200) | Preparation 6 (200) |
| 2 | Preparation 1 (100) | Preparation 2 (200) | Preparation 6 (200) |
| 3 | Preparation 3 (100) | Preparation 2 (200) | Preparation 6 (200) |
| 4 | Preparation 1 (100) | Preparation 2 (200) | Preparation 7 (200) |
| CE 1 | Preparation 4 (100) | Preparation 5 (200) | Preparation 6 (200) |

Examples 5-8 and Comparative Example 2

After preparation of Examples 1-4 and Comparative Example 1, the coated panels were allowed to stabilize for 10 days under ambient conditions. The panels of Examples 1-4 and CE 1 were then subjected to accelerated aging by exposure to 10 aging cycles, with each cycle requiring 24 hours, of the following conditions in a Thermotron Environmental Chamber (Holland, Mich.). The panels were introduced to the chamber and the chamber equilibrated to 20° C., 50% RH. The conditions were decreased to −40° C., 0% RH and held for 60 minutes. The temperature and humidity was then increased to 20° C., 50% RH and held for 60 minutes, followed by an increase to 70° C., 80% RH and a hold time of 60 minutes. The temperature and humidity were then programmed to decrease to 20° C., 50% RH with a hold time of 60 minutes. The temperature and relative humidity were then decreased to −40° C., 0% RH with a hold time of 240 minutes. The temperature and humidity was then increased to 20° C., 50% RH and held there for 240 minutes, followed by an increase to 70° C., 80% RH with a hold time of 240 minutes. The temperature and humidity were then decreased to 20° C., 50% RH and held there for 80 minutes.

The panels were examined daily by visual inspection for cracking and the number of observed cracks per square foot on each day is recorded Table 2, wherein Day 0 was recorded the same day as the accelerated aging procedure, Day 1 on the subsequent day, etc. No differentiation was made between newly observed cracks and cracks that were previously observed; as such the number of cracks for each day in Table 2 represents the total number of cracks observed on the indicated day, not the number of cracks that first appeared between the previous day and the day of note.

TABLE 2

Accelerated Aging Study Results

Number of Cracks Observed

| Example | Panel | Day 0 | Day 1 | Day 2 | Day 3 | Day 4 | Day 5 | Day 6 | Day 7 | Day 8 | Day 9 | Day 10 |
|---|---|---|---|---|---|---|---|---|---|---|---|---|
| 5 | Ex 1 | 2 | 3 | 3 | 3 | 3 | 4 | 4 | 6 | 11 | 11 | 11 |
| 6 | Ex 2 | 3 | 4 | 5 | 5 | 5 | 6 | 6 | 6 | 9 | 9 | 9 |
| 8 | Ex. 3 | 0 | 1 | 2 | 2 | 2 | 2 | 3 | 3 | 4 | 5 | 5 |
| 9 | Ex 4 | 0 | 0 | 0 | 0 | 0 | 0 | 0 | 0 | 0 | 0 | 0 |
| CE 2 | CE 1 | 0 | 0 | 0 | 1 | 1 | 1 | 13 | * | * | * | 49 |

An * indicates that the number of cracks was not counted on that day

Preparation 8

Into a 1 L Tripour beaker was weighed n-butyl acetate (160.99 g) and FR-513 (3.46 g). The contents were stirred with an overhead mixer at 200 rpm, for five minutes, to effect dissolution of the FR-513. K-Flex K188 (19.5 g) was added to the solution, followed by stirring at 300 rpm for five minutes. K-Flex XM337 (12.99 g) was then added to the Tripour and the contents stirred at 300 rpm for five minutes. The following components were added sequentially while stirring at 300 rpm: Tinuvin 1130 (0.68 g), Tinuvin 292 (0.34 g), K Cat 4205 (0.68 g), and zoldine (1.36 g).

Into a 100 mL Tripour beaker was weighed 50.0 g of Coating 1 Part A. Desmodur N3300 A (7.35 g) was then measured into the beaker. The contents were stirred with a wooden stir stick until the contents appeared homogenous and transparent.

This composition was spray applied to a veneer panel to achieve a dry-film thickness of 100 microns Preparation 9

Into a 1 L Tripour beaker was weighed n-butyl acetate (97.39 g) and FR-513 (9.00 g). The contents were stirred with an overhead mixer at 200 rpm, for five minutes, to effect dissolution of the FR-513. K-Flex K188 (51.05 g) was added to the solution, followed by stirring at 300 rpm for five minutes. K-Flex XM337 (34.02 g) was then added to the Tripour and the contents stirred at 300 rpm for an additional five minutes. The following components were added sequentially while stirring at 300 rpm: Tinuvin 1130 (1.89 g), Tinuvin 292 (0.86 g), K Cat 4205 (1.84 g), zoldine (3.62 g), and Novec 4432 (0.34 g).

Into a 100 mL Tripour beaker was weighed 50.0 g of Coating 2 Part A. Desmodur N3300 A (19.13 g) was then measured into the beaker. The contents were stirred with a wooden stir stick until the contents appeared homogenous and transparent.

This composition was spray applied to a veneer panel to achieve a dry-film thickness of 250 microns Preparation 10

To prepare Part A, 81.18 g of Bayhydrol A 2695 was weighed into a 250 ml Tripour beaker. The beaker was placed under the overhead mixer and stirred at 400 RPM. To the Bayhydrol A 2695, 37.80 g of water, 2.88 g of Envirogem AD01, and 1.26 g of Tego Flow 425 was added. In a small mixing cup 9.0 g of water and 9.0 g of Levagard TEP-Z were weighed and 1.80 g of Tinuvin 5151 and 0.90 g of Tinuvin 123-DW were weighed and added. These four materials were mixed by hand and added to the Bayhydrol A 2695 beaker and allowed to stir. In another small mixing cup a 50% mixture of Borchigel LW 44 and water was prepared and stirred by hand. 0.47 g of this mixture was added to the Bayhydrol A 2695 beaker and all materials were left to stir for approximately 5 minutes.

To prepare part B, 26.25 g of Baydydur XP 2655 was mixed with 6.56 g of methoxypropyl acetate (MPA) to create an 80% solution of isocyanate in solvent. To this mixture 1.48 g of K-KAT 6212 was added. Part B is mixed by hand until a homogenous mixture is obtained.

Part B was then added to Part A and the coating was mixed by hand for approximately 30 seconds. The coating was put into a 200 ml spray cup liner and spray-applied to veneer panels to achieve a dry-film thickness of 150 microns. After a one hour open time the panels were placed in the oven at 38° C.

Preparation 11

To prepare Part A, 15.20 g of Teraspartic 277 was weighed into a 100 ml Tripour beaker and 0.16 g of Tallicin 4040 was weighed and added. 3.12 g of Levagard TEP-Z and 6.40 g of butyl acetate were added to the beaker and stirred by hand until mixed. 0.74 g of Zoldine and 0.04 g of Novec were also weighed and added to the mixture. The formulation (Part A) was stirred by hand until the mixture changed from cloudy to clear.

15.20 g of the isocyanate Teracure NX-16 was weighed into part A and stirred for approximately 30 seconds.

The formulation was added to a 200 ml spray cup liner and the coating was sprayed onto a 6 inch by 12 inch veneer panel to achieve a dry film thickness of 200 microns. After a 45 minute open time the panel was put into the oven at 38° C. for 24 hours.

TABLE 3

Examples 10-11

| Example | Substrate Contacting Layer (thickness, microns) | Middle Layer (thickness, microns) | Top Layer (thickness, microns) |
|---|---|---|---|
| 10 | Preparation 8 (100) | Preparation 9 (250) | Preparation 10 (150) |
| 11 | Preparation 8 (100) | Preparation 9 (250) | Preparation 11 (200) |

Example 12

A panel of Example 11 was damaged in the following manner. A Post-it™ was placed on the surface of the top-coat and a ball point pen was used to write "3M Company" on the paper. Sufficient pressure was used so that the phrase "3M Company" was impressed onto the panel and the impression was visible to the naked eye on the panel after the Post-it™ was removed.

The panel was then heated with warm (approximately 40° C.) air, which was blown onto the panel with a commercial hair drier. After a few minutes, the phrase "3M Company" disappeared and no impressions were visible on the panel.

What is claimed is:

1. An article comprising:
   a wood or wood veneer substrate
   a substrate contacting layer on the wood veneer substrate, wherein the substrate contacting layer is soft and has a thickness of 25 micrometers to 125 micrometers as measured from surface of the wood veneer to the outermost surface of the substrate contacting layer, and wherein the substrate contacting layer has a pencil hardness from HB to H;
   a middle layer on the substrate contacting layer, the middle layer comprising polyurethane, wherein the middle layer is soft and has a thickness of 100 micrometers to 250 micrometers; and
   a top layer on the middle layer, wherein the top layer is hard, and has a thickness of 100 to 250 micrometers.

2. The article of claim 1, wherein the top layer comprises at least one acrylic polymer, aspartic ester polymer, or polyurethane.

3. The article of claim 1, wherein the wood veneer substrate has a surface comprising pores and the substrate contacting layer penetrates into at least some of the pores of the wood veneer substrate.

4. The article of claim 1, wherein the adhesion value of the substrate contacting layer to the wood veneer is 1700 kPa to 4150 kPa.

5. The article of claim 1, wherein polyurethane in the substrate contacting layer is the reaction product of a polyester polyol and a branched polyisocyanate.

6. The article of claim 1, wherein the polyurethane in the middle layer is the reaction product of a polyester polyol and a branched polyisocyanate.

7. The article of claim 1, wherein polyurethane in the substrate contacting layer is an aliphatic polyurethane.

8. The article of claim 1, wherein the polyurethane in the middle layer is an aliphatic polyurethane.

9. The article of claim 1, wherein the substrate contacting layer further comprises a fire retardant.

10. The article of claim 1, wherein the middle layer further comprises a fire retardant.

11. An article of claim 1, wherein the substrate contacting layer, the middle layer, and the top layer constitute a coating, and the coating is optically clear.

12. An article of claim 1, wherein the substrate contacting layer, the middle layer, and the top layer constitute a coating, and the coating comprises a stain or pigment.

13. The article of claim 1, wherein the article is a component of furniture, a steering wheel, a boat, a car, an airplane, a musical instrument, or a frame.

14. An article comprising:
   a wood or wood veneer substrate
   a substrate contacting layer on the wood veneer substrate, wherein the substrate contacting layer is soft and has a thickness of 25 micrometers to 125 micrometers as measured from surface of the wood veneer to the outermost surface of the substrate contacting layer;
   a middle layer on the substrate contacting layer, the middle layer comprising polyurethane, wherein the middle layer is soft, with a pencil hardness from HB to H, and has a thickness of 100 micrometers to 250 micrometers; and
   a top layer on the middle layer, wherein the top layer is hard and has a thickness of 100 to 250 micrometers.

15. An article comprising:
   a wood or wood veneer substrate
   a substrate contacting layer on the wood veneer substrate, wherein the substrate contacting layer is soft and has a thickness of 25 micrometers to 125 micrometers as measured from surface of the wood veneer to the outermost surface of the substrate contacting layer;
   a middle layer on the substrate contacting layer, the middle layer comprising polyurethane, wherein the middle layer is soft and has a thickness of 100 micrometers to 250 micrometers; and
   a top layer on the middle layer, wherein the top layer is hard, with a pencil hardness from 3H to 6H, and has a thickness of 100 to 250 micrometers.

* * * * *